US009220056B2

United States Patent
Iwamura et al.

(10) Patent No.: US 9,220,056 B2
(45) Date of Patent: Dec. 22, 2015

(54) METHOD OF BARRING ACCESS TO NETWORK, MOBILE DEVICE FOR THE METHOD, AND PROCESSOR USED IN MOBILE DEVICE

(75) Inventors: Mikio Iwamura, Tokyo (JP); Minami Ishii, Tokyo (JP); Mutsumi Ishimoto, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 172 days.

(21) Appl. No.: 14/000,339

(22) PCT Filed: Dec. 20, 2011

(86) PCT No.: PCT/JP2011/079452
§ 371 (c)(1),
(2), (4) Date: Aug. 19, 2013

(87) PCT Pub. No.: WO2012/114631
PCT Pub. Date: Aug. 30, 2012

(65) Prior Publication Data
US 2013/0331099 A1      Dec. 12, 2013

(30) Foreign Application Priority Data
Feb. 21, 2011   (JP) .................................. 2011-035114

(51) Int. Cl.
*H04W 48/16*     (2009.01)
*H04W 76/00*     (2009.01)
*H04W 48/02*     (2009.01)
*H04W 4/22*      (2009.01)

(52) U.S. Cl.
CPC .............. *H04W 48/16* (2013.01); *H04W 48/02* (2013.01); *H04W 4/22* (2013.01); *H04W 76/007* (2013.01)

(58) Field of Classification Search
None
See application file for complete search history.

(56) References Cited

U.S. PATENT DOCUMENTS

| 2011/0201307 A1* | 8/2011 | Segura ........................... 455/411 |
| 2011/0274040 A1* | 11/2011 | Pani et al. ...................... 370/328 |
| 2012/0039171 A1* | 2/2012 | Yamada et al. ............... 370/232 |

OTHER PUBLICATIONS

QoS in LTE PSCR Demo Days by Wim Brouwer, dated Dec. 2010.*
3GPP TS 36.331 V10.0.0, dated Dec. 2010, p. 36-40, 140, 141.*
International Search Report for corresponding International Application No. PCT/JP2011/079452, mailed Mar. 27, 2012 (3 pages).
Written Opinion for corresponding International Application No. PCT/JP2011/079452, mailed Mar. 27, 2012 (3 pages).
(Continued)

*Primary Examiner* — Daniel Lai
(74) *Attorney, Agent, or Firm* — Osha Liang LLP

(57) ABSTRACT

When a network is in a state of requiring any sort of access barring, determining whether a special type access class is included as an access class to which an own device belongs, determining appropriateness of an access by referring to, from barring information, a first barring information for designating whether a mobile device belonging to each access class is subject to access barring when having determined that the special type access class is included, and determining the appropriateness of an access by referring to, from the barring information, second barring information indicating a value serving as a reference for determining the appropriateness of an access according to a relationship between a numerical value generated by each mobile device and the reference indicated by the second barring information when having determined that the special type access class is included.

16 Claims, 8 Drawing Sheets

(56) References Cited

OTHER PUBLICATIONS

NTT DOCOMO, Inc., "AC-Barring for Mobile Originating CSFB calls"; 3GPP TSG-RAN2 Meeting #70bis, R2-103867; Stockholm, Sweden, Jun. 28-Jul. 2, 2010 (12 pages).

3GPP TS 36.331 V9.5.0; "3rd Generation Partnership Project; Technical Specification Group Radio Access Network; Evolved Universal Terrestrial Radio Access (E-UTRA); Radio Resource Control (RRC); Protocol specification (Release 9)"; Dec. 2010 (252 pages).

* cited by examiner

METHOD OF BARRING ACCESS TO NETWORK, MOBILE DEVICE FOR THE METHOD, AND PROCESSOR USED IN MOBILE DEVICE

TECHNICAL FIELD

The present invention relates to a technology to bar an access to a network from a mobile device connectable to a radio access network.

BACKGROUND ART

A network of a long term evolution (LTE) system put to practical use as a next-generation radio access system controls a congestion state of the network by an access barring method as illustrated in FIG. 8 (see Non-Patent Literature 1).

A concept of an access class (AC) is introduced to the network access barring method of the LTE. Each mobile device belongs to at least one AC, and in the AC, normal type ACs (AC=0 to 9) and special type ACs (AC=11 to 15) exist.

As the special type AC, for example, AC=11 is allocated to a mobile device for network operators, AC=12 is allocated to a mobile device for police services, AC=13 is allocated to a mobile device for use by government, and AC=14 is allocated to a mobile device for emergency services. The normal type AC may be additionally allocated to the mobile device to which the special type AC is allocated.

In access barring of the LTE, each AC notifies whether the AC is subject to no barring (0) or whether the AC is subject to barring (1) as information of ac-BarringForSpecialAC. Note that the normal type ACs (AC=0 to 9) cannot be subject to no barring (0) when the network requires some sort of barring. Therefore, only the information of the special type ACs (AC=11 to 15) needs to be notified.

That is, in the LTE system, information designating no barring (0) to preferential ACs (for example, AC=12 and 14) from among the special type ACs, and designating barring (1) to the rest of the special type ACs and the normal type ACs (for example, AC=0 to 9, 11, 13, and 15) is notified.

In the network access barring method of the LTE, while an access of at least a part of the ACs to which barring (1) is designated is denied, keeping an access of the same AC denied for a long time is problematic from a standpoint of fairness of communication service. Therefore, appropriateness of an access is determined by comparison with a random number generated by a mobile device so that a mobile device, an access of which is denied, is changed with time.

For example, when it is desired to bar 30%, if a value indicating "70%" is notified in advance, the mobile device compares the value and a random number, so that it is determined that an access is allowed by the probability of 70% (70% from among the mobile devices with barring, which have received barring information), and it is determined that an access is denied by the probability of 30% (30% from among the mobile devices with barring, which have received the barring information). Since each mobile device generates a random number every time accessing the network, it is determined that an access of any mobile device is allowed 7 times out of 10 on average from a mobile device's viewpoint, whereby the fairness is maintained.

For this purpose, in the LTE, information for designating values at 5% interval between 0 and 95% (values to be compared with a random number by a mobile device having an AC that is subject to barring) is notified as information of ac-BarringFactor.

Then, the mobile device that has received the barring information, as illustrated in FIG. 8, according to the ac-BarringForSpecialAC, proceeds to Yes at S910 regarding the ACs to which 0 is designated from among the special type ACs (for example, AC=12 and 14) and determines that an access is allowed (S950), and proceeds to No at S910 regarding the ACs to which 1 is designated from among the special type ACs and the normal type ACs (for example, AC=0 to 9, 11, 13, 15) and causes the ACs to generate random numbers (S920). If the generated random number is smaller than the value designated by the ac-BarringFactor (Yes at S930), it is determined that an access is allowed (S950), and if the generated random number is larger than the value designated by the ac-BarringFactor (No at S930), it is determined that an access is denied (S940).

CITATION LIST

Non-Patent Literature

Non-Patent Literature 1: 3GPP TS36.331

SUMMARY OF INVENTION

Technical Problem

In the network access barring method in the LTE system, the mobile device having a AC to which barring (1) is designated from among the special type ACs needs to refer to both of the two types of barring information: the ac-BarringForSpecialAC and the ac-BarringFactor, and also needs processing of generating a random number and performing comparison in addition to the decoding processing. Therefore, a load of a processor of the mobile device becomes high.

Furthermore, when the ac-BarringFactor indicates a value (0%) with which an access is always denied if compared with a random number, an access being denied was determined from the beginning, but it turns out that resources are wastefully consumed by the decoding and the processing of generating a random number.

An objective of the present invention is to provide, in view of the foregoing, a method of barring an access to a network capable of preventing a mobile device from wastefully performing processing such as decoding of information notified from the network for access barring and generation of a random number, and of reducing a load.

Solution to Problem

The method of barring an access to a network according to a principle of the present invention is a method of barring an access to a network from a mobile device connectable to a radio access network. Each mobile device connectable to the radio access network belongs to at least one access class, a special type access class and a normal type access class exist in the access class, notification information to be notified to each mobile device from the radio access network includes barring information for barring an access to the network, and the barring information includes a first barring information for designating whether a mobile device belonging to each access class is subject to access barring, and second barring information indicating a value serving as a reference for determining appropriateness of an access according to a relationship between the value and a numerical value generated by each mobile device. The mobile device determines whether the mobile device includes the special type access class as an access class to which the mobile device itself belongs when establishing connection to the radio access network; when having determined that the mobile device includes the special type access class, refers to the first barring information, and determines the appropriateness of an access according to designation by the first barring information; and when having determined that the mobile device does not include the special type access class, refers to the second barring information, and determines the appropriateness of an access according to a relationship between the reference indicated by the second barring information and a numerical value generated by the mobile device itself.

According to the above-described configuration, in any mobile device, the barring information to be referred can be limited to one of two types, whereby the processing of generating a numerical value can be minimized.

Note that the above-described first barring information may describe whether only the special type access classes are subject to barring, and in that case, it can be understood that notification of the first barring information itself means the normal type access classes are designated to be subject to access barring.

In the above-described configuration, the mobile device may decode the first barring information from the received barring information when referring to the first barring information, and may decode the second barring information from the received barring information when referring to the second barring information.

Accordingly, only one of the two types of barring information to be referred is subjected to the decoding processing, whereby a waste of the resources in the mobile device can be prevented.

Note that, if a network having a system in which the two types of barring information are notified in an independently receivable manner is employed, it is possible that only one barring information to be referred is received and the other barring information is not received, whereby the effect of resource saving is further enhanced.

In the above-described configuration, the mobile device may determine whether the reference indicated by the second barring information is a value determined that an access is denied regardless of the numerical value generated by the mobile device when referring to the second barring information, may determine that an access is denied without generating the numerical value if the value is such a value, and may determine the appropriateness of an access by generating the numerical value and performing comparison between the numerical value and the value serving as the reference if the value is not such a value.

Accordingly, the mobile device having an access class to which barring (1) is designated from among the special type access classes needs neither generating a numerical value nor converting decoded second barring information into a value to be compared with an actually generated numerical value when the content of the second barring information indicates an access cannot be allowed, in addition to not having necessity to decode the first barring information. Therefore, the processing can be simplified, and a waste of the resources in the mobile device can be prevented.

Note that if it is a network having a possibility in which a value determined that an access is allowed regardless of the numerical value generated by the mobile device is notified, whether the received second barring information indicates such a value is determined, and it may be determined that an access is allowed without generating the numerical value.

In the above-described configuration, when the first barring information is information that designates a certain mobile device is subject to access barring while another mobile device is not subject to access barring, the reference indicated by the second barring information may be a value determined that an access is denied regardless of the numerical value generated by the mobile device.

This provides barring to the content of the barring information notified from the radio access network because, while the special type access class should be basically preferentially handled over the normal type access class, if the above configuration is employed in the mobile device, following inconvenience may be caused.

The inconvenience is caused if a value indicating 70% (accesses of 30% of the mobile devices are denied) is notified as the second barring information, and designation in which no barring (0) and barring (1) are mixed in the special type access classes are notified as the first barring information.

When such barring information is received, according to the above-described configuration, while it is determined that accesses of the mobile devices having access classes to which barring (1) is designated by the first barring information from among the special type access classes are denied, accesses of 70% of the mobile devices having the normal type access class is allowed as a result of the comparison between the generated numerical values and 70% by the second barring information. That is, an unreasonable situation may be caused where accesses of the mobile devices having the special type access classes that are supposed to be preferentially handled are denied, and accesses of 70% of the mobile devices having the normal type access classes that are supposed not to be preferentially treated are allowed.

To remove the above-described inconvenience, the network side that creates the barring information may cause the first barring information to designate no barring (0) to all of the special type access classes, when causing the reference indicated by the second barring information to be a value with which an access may be allowed depending on a numerical value generated by the mobile device. In other words, when the first barring information is caused to designate that a certain mobile device is subject to access barring while another mobile device is not subject to access barring, the reference indicated by the second barring information may be caused to be a value determined that an access is denied regardless of the numerical value generated by the mobile device.

In the above-described configuration, the value serving as the reference may be determined based on a percentage of mobile device, an access of which is desired to be allowed in the network, and the numerical value generated by each mobile device may be a number functioning as a random number.

As the number functioning as the random number, for example, a pseudo random number generated by a processor in each mobile device, a number obtained by applying processing to a value unique to each mobile device to be changed with time, and the like may be implemented. In short, if the probability of an access being allowed is different among the mobile devices having the same normal type access class, it will be a problem from the standpoint of fairness of communication service. Therefore, the number functioning as the random number mentioned here is a number that can be obtained such that, if it is continued to compare a number generated every time and the same reference value, the mobile devices having different probabilities of an access being allowed come to have the similar number.

In the above-described configuration, the mobile device may start the setting procedure of the radio resource control (RRC) connection corresponding to the network in accordance with determination that an access is allowed.

Accordingly, while the protocol architecture of the radio interface is configured from a physical layer (L1), a data link layer (L2), and a network layer (L3), the access barring in the L3 layer of the mobile device becomes possible.

In the above-described configuration, the radio access network can be operated according to the LTE system.

A mobile device according to a principle of the present invention is a mobile device connectable to a radio access network, each mobile device connectable to the radio access network belonging to at least one access class, and a special type access class and a normal type access class existing in the access class. The mobile device includes a reception means configured to receive notification information notified from the radio access network; a storage means configured to take out from the notification information and store barring information for barring an access to the network and including a first barring information for designating whether a mobile device belonging to each access class is subject to access barring and second barring information indicating a value serving as a reference for determining appropriateness of an access according to a relationship between the value and a numerical value generated by each mobile device; a storing means configured to store information indicating at least one access class to which the mobile device itself belongs; a generation means configured to select one numerical value from among a plurality of available numerical values every time generation of a numerical value is instructed and to generate the numerical value at the time of instruction; and a determination means configured to determine whether the mobile device includes the special type access class based on the information of the storing means, to refer to the first barring information stored in the storage means and to determine the appropriateness of an access according to designation of the first barring information when having determined that mobile device includes the special type access class, to refer to the second barring information stored in the storage means and to determine the appropriateness of an access according to a relationship between the reference indicated by the second barring information and the numerical value generated by the generation means when having determined that mobile device does not include the special type access class.

A processor according to a principle of the present invention is incorporated in and used by a mobile device. Each mobile device connectable to the radio access network belongs to at least one access class, a special type access class and a normal type access class exist in the access class, notification information to be notified to each mobile device from the radio access network includes barring information for barring an access to the network, and the barring information includes first barring information for designating whether a mobile device in each access class is subject to access barring, and second barring information indicating a value serving as a reference for determining appropriateness of an access according to a relationship with a numerical value generated by each mobile device. Then, the processor determines whether the mobile device includes the special type access class as an access class to which the mobile device itself belongs when establishing connection to the radio access network; when having determined that the mobile device includes the special type access class, refers to the first barring information, and determines the appropriateness of an access according to designation by the first barring information; and when having determined that the mobile device does not include the special type access class, refers to the second barring information, and determines the appropriateness of an access according to a relationship between the reference indicated by the second barring information and a numerical value generated by the mobile device itself.

Note that each invention of the above-described method of barring an access to a network can be established as an invention of a mobile device and as an invention of a processor used in a mobile device. The processor may be incorporated in the interior of the mobile device as a semiconductor chip.

Advantageous Effects of Invention

As described above, according to the method of barring an access to a network provided by the present invention, in the mobile device, wasteful performance of the processing such as decoding of information notified from the network for access barring and generation of a random number can be prevented, and the load can be reduced.

DESCRIPTION OF EMBODIMENTS

Hereinafter, embodiments of the present invention will be described with reference to FIGS. 1 to 7.

Figure 1:
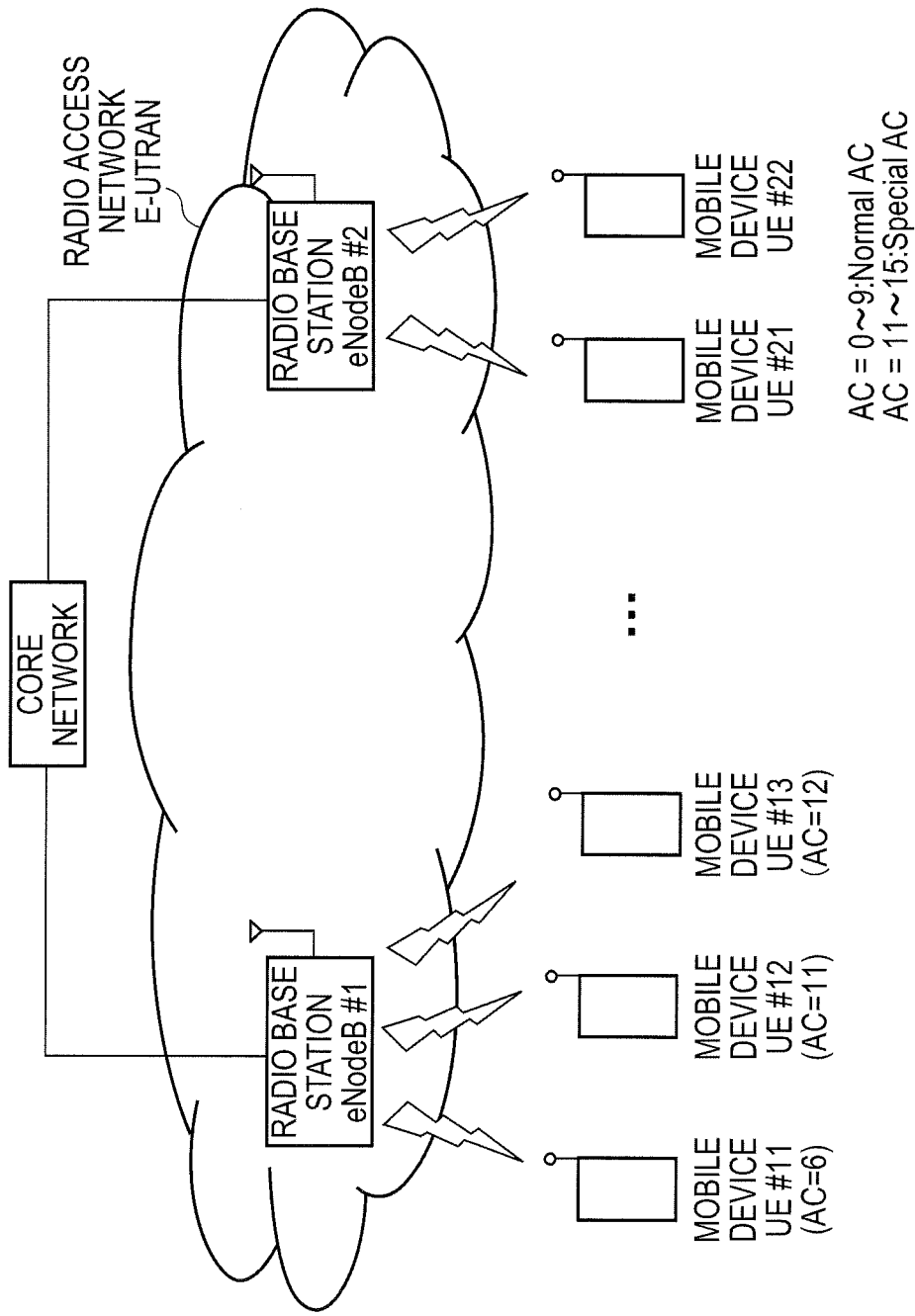
FIG. 1 is an overall configuration diagram of an example of a radio network system to which the present invention is applicable.

FIG. 1 is a diagram illustrating an overall configuration of a radio network system of an LTE system. The radio access network in the LTE system is called E-UTRAN, and is located between a core network and a mobile device user equipment (UE). The E-UTRAN is configured such that a plurality of eNodeBs that function as a radio base station and a radio network control device is arranged.

In the example of FIG. 1, normal type access classes (normal AC) are AC=0 to 9, special type access classes (special AC) are AC=11 to 15, a UE#11 belongs to AC=6 (normal), a UE#12 belongs to AC=11 (special: for operators), and a UE#13 belongs to AC=12 (special: for police services). The UE#12 and UE#13 may have AC=5 and 3 (normal) respectively, in addition to AC=11 and 12, for example. If they have special ACs, existence and a form of access barring can be determined regardless of which normal AC they belong to.

Figure 2:
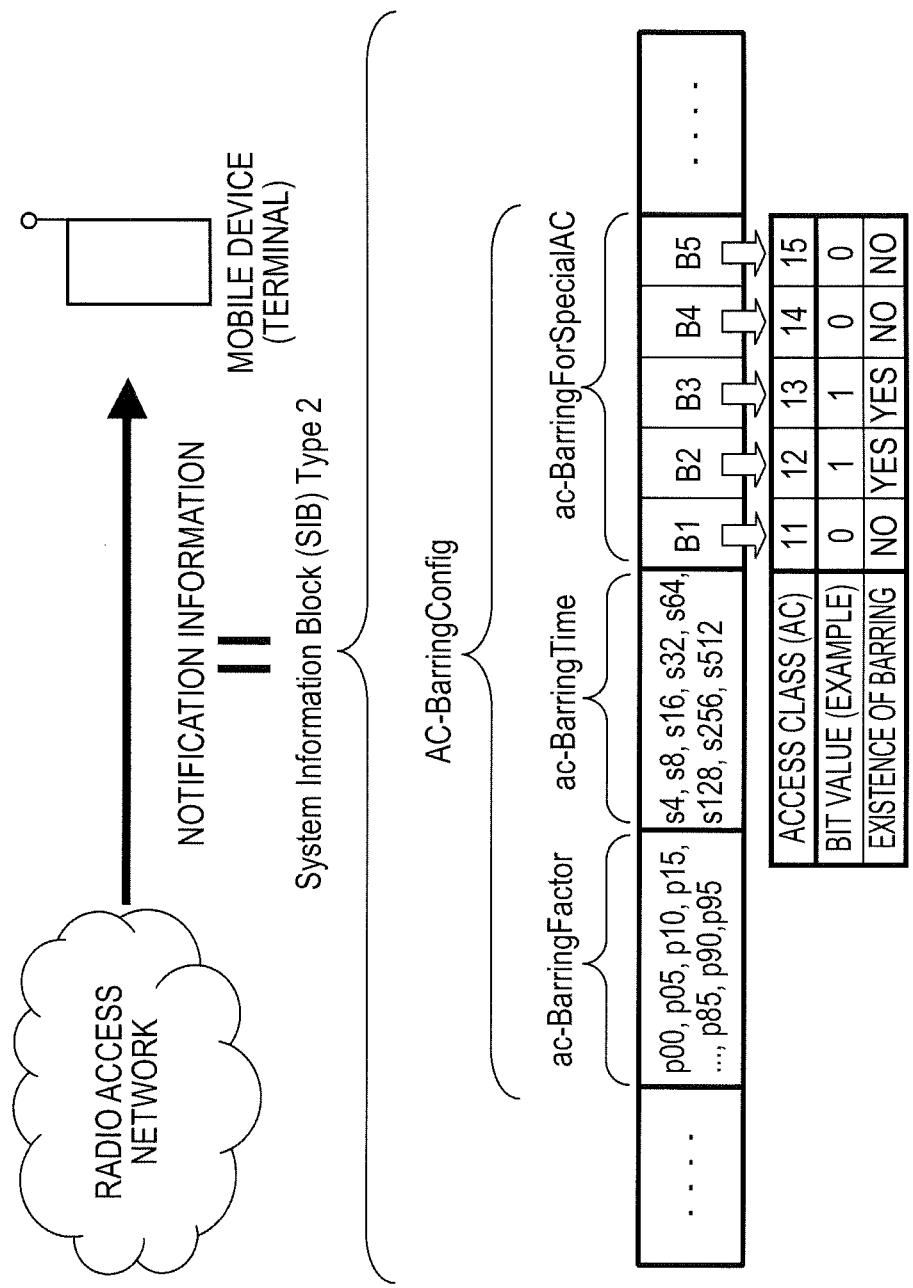
FIG. 2 is a diagram illustrating an example of information to be notified to a mobile device from a LTE-system radio access network.

Information notified from a UTRAN to a UE of FIG. 1 through a broadcast channel includes information called system information block (SIB) type 2 as illustrated in FIG. 2, and further includes barring information called AC-BarringConfig therein. The inclusion of AC-BarringConfig can be understood that the radio access network is in a state of requiring some sort of access barring.

Figure 3:
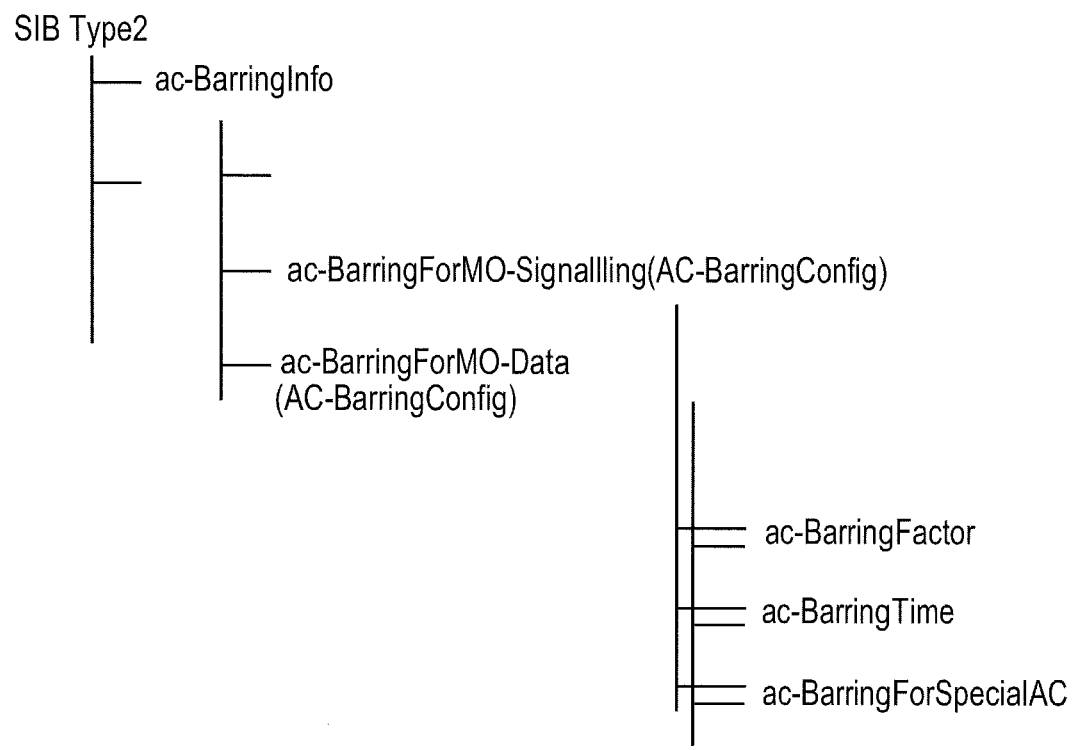
FIG. 3 is a diagram illustrating an example of a more detailed configuration of the information of FIG. 2.

To be specific, as illustrated in FIG. 3, an information element of ac-BarringInfo can be included in the SIB type 2 (SIB2), and any one of or both of ac-BarringForMO-Signalling (an information element referred to when RRC connection for signaling generated by a mobile device is set) and ac-BarringForMO-Data (an information element referred to when RRC connection for call generated by a mobile device is set) can be further included therein.

Both of the ac-BarringForMO-Signalling and the ac-BarringForMO-Data include the AC-BarringConfig. Therefore, when it is detected that the ac-BarringInfo and the ac-BarringForMO-Signalling, or the ac-BarringInfo and the ac-BarringForMO-Data are included in a mobile device that has received the SIB2, it can be determined that the barring information (AC-BarringConfig) is included.

A structure of the information of the AC-BarringConfig can be defined by ASN.1 (abstract syntax notation 1), and includes three elements: (1) ac-BarringFactor (an example of second barring information), (2) ac-BarringTime, and (3) ac-BarringForSpecialAC (an example of first barring information). These three elements are described in a sequence type (SEQUENCE), and are described in the order of (1), (2), and (3) because the order of appearance of the elements has importance.

The (1) is information for designating values at 5% intervals between 0 and 95%: p00, p05, p10, p15, p20, . . . , p85, p90, and p95. This information is described in an enumerated type (ENUMERATED). Therefore, first, the information is converted into a numerical value that serves as an object to be actually compared with a random number, and is then subjected to comparison processing with a random number described below.

The (2) is information for designating values of s4, s8, s16, s32, . . . , s256, and s512, and when setting of the RRC connection cannot be started due to access barring, the values serve as the basis to calculate numerical values to be set in a timer that determines how long the setting of the RRC connection is prohibited.

The (3) is a bit sequence, and is composed of five bits corresponding to AC=11 to 15. The bit value of each bit being 0 indicates there is no barring while the bit value being 1 indicates there is barring.

When a mobile device that has received the AC-BarringConfig decodes the information elements, processing of decoding content of necessary information element from among the (1), (2), and (3) can be performed by, for example, referring to a specification of the ASN.1.

Further, as for the information of the AC-BarringConfig, the eNodeB typically writes content in accordance with the degree of congestion of a network to be controlled by the eNodeB itself in the SIB2 to be put in a broadcast channel.

Figure 4:
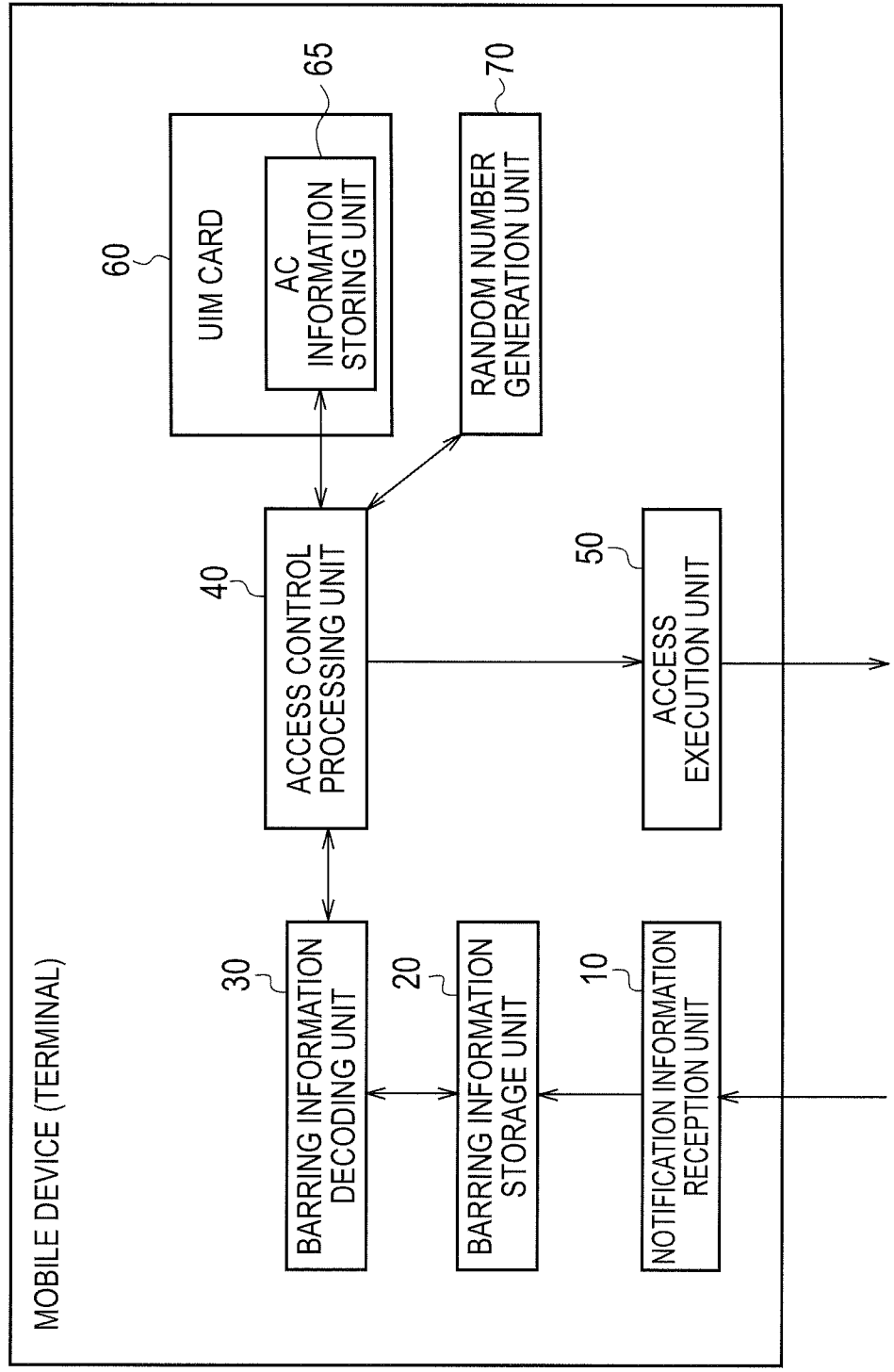
FIG. 4 is a block diagram illustrating an example of an internal configuration of a mobile device (terminal) in the present embodiment.
Figure 5:
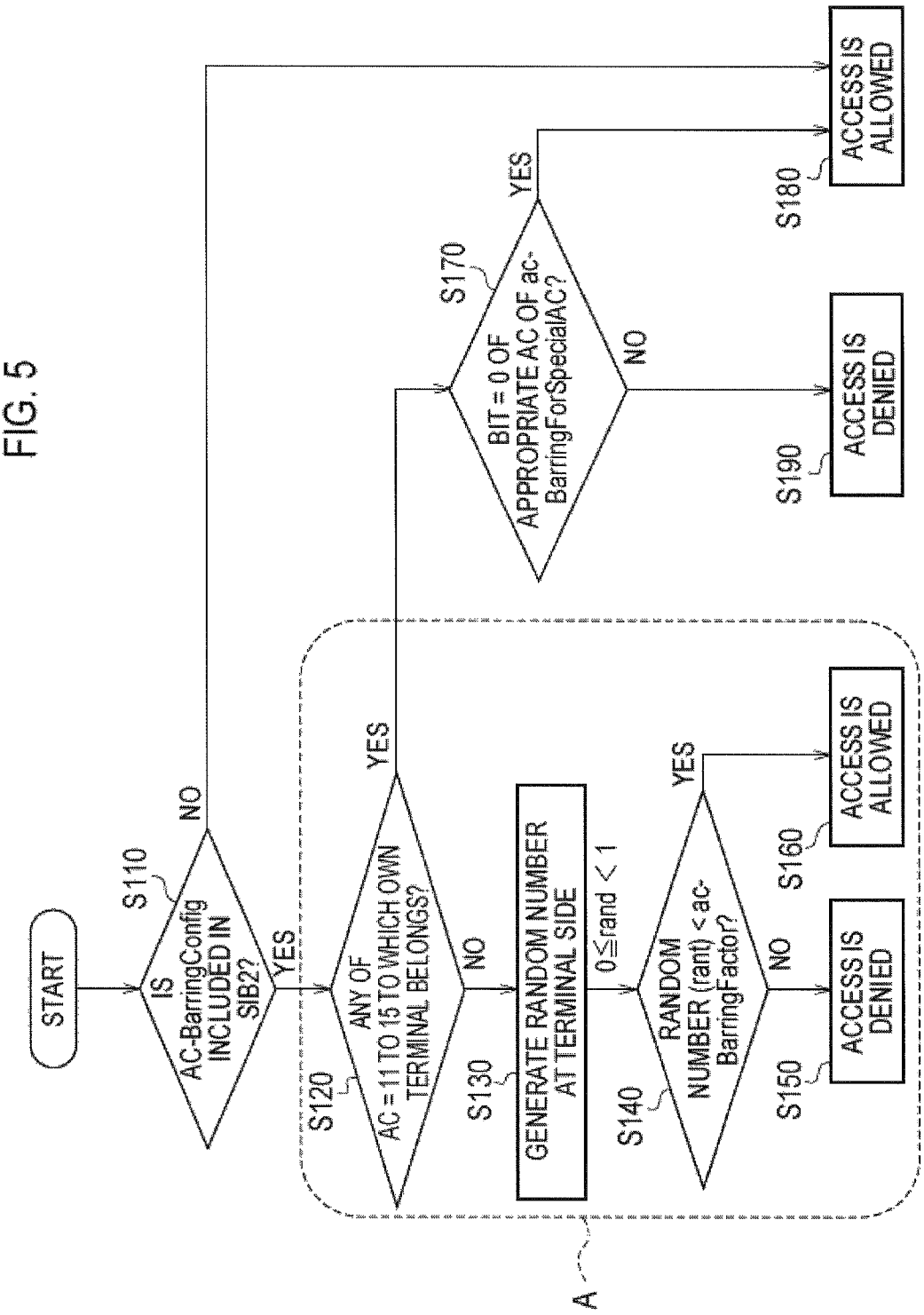
FIG. 5 is a flowchart illustrating an example of an operation of the mobile device (terminal) in the present embodiment.

An operation of a mobile device that has received the SIB2 notified as described above will be described with reference to the block diagram of FIG. 4 and the flowchart of FIG. 5.

When starting the setting of the RRC connection, first, the mobile device determines whether the SIB2 most recently received by a notification information reception unit 10 includes the AC-BarringConfig (S110). If the SIB2 does not include the AC-BarringConfig, the mobile device determines that an access is allowed (S180), and causes an access execution unit 50 to start a setting procedure of the RRC connection.

When the SIB2 includes the AC-BarringConfig, the access control processing unit 40 refers to the AC information storing unit 65 in the user identification module (UIM) card 60, and checks whether any of AC=11 to 15 is stored as the AC to which the own device belongs (S120).

When the own device only has the normal type AC (stores none of AC=11 to 15), the access control processing unit 40 instructs the random number generation unit 70 to generate a random number (pseudo random number, and the like) of 0 to 1 (exclusive of 1) (S130). In the meantime, the access control processing unit 40 instructs the barring information decoding unit 30 to decode information of the ac-BarringFactor from the AC-BarringConfig stored in the barring information storage unit 20.

Then, the access control processing unit 40 converts the information of the ac-BarringFactor (here, information indicating p00 to p95) to be the numerical values of 0% to 95% to be actually compared with the random number, and checks magnitude relation between the numerical value and the generated random number (S140).

For example, when the ac-BarringFactor indicates p60 (designated with intent to allow an access of 60% and to deny an access of 40%) and the random number is 45%, the access control processing unit 40 determines that an access is allowed because of 45<60 (S160), and the access execution unit 50 starts the setting procedure of the RRC connection. In the same state, when the generated random number is 88%, the access control processing unit 40 determines that an access is denied because of 88>60 (S150).

When having determined that an access is denied, the access control barring unit 40 causes the barring information decoding unit 30 to decode information of subsequent ac-BarringTime stored in the barring information storage unit 20. Then, the access control processing unit 40 calculates a value to be set to the timer based on the information, and starts an operation from S110 again in order to start the setting of the RRC connection again as required when the timer is activated.

When the own device has a special type AC (stores any of AC=11 to 15), the access control processing unit 40 instructs the barring information decoding unit 30 to decode information of the ac-BarringForSpecialAC from the AC-BarringConfig stored in the barring information storage unit 20. Then, the access control processing unit 40 checks a value of a bit corresponding to the special type AC to which the own device belongs (AC=12 if it is the UE#13 in the example of FIG. 1, AC=12 is the second bit in the example of FIG. 2, and the second bit value is "1" in the example of FIG. 2) (S170).

Then, when the bit value corresponding to the special type AC to which the own device belongs is "1", the access control processing unit 40 determines that there is barring and an access id denied (S190). Following that, the access control processing unit 40 sets the timer using decoded information if the information of the ac-BarringTime has been already decoded, or information decoded by the barring information decoding unit 30 if having not been decoded, and determines a period of prohibiting the setting of the RRC connection. In this case, even if the ac-BarringForSpecialAC designates barring to the special type AC to which the own device belongs, the access control processing unit 40 can determine that an access is denied without causing the random number generation unit 70 to generate a random number, and also without converting the information of the ac-BarringFactor into a numerical value to be compared.

On the other hand, when the bit value corresponding to the special type AC to which the own device belongs is "0", the access control processing unit 40 determines that an access is allowed (S180) and starts the setting procedure of the RRC connection by the access execution unit 50.

Figure 6:
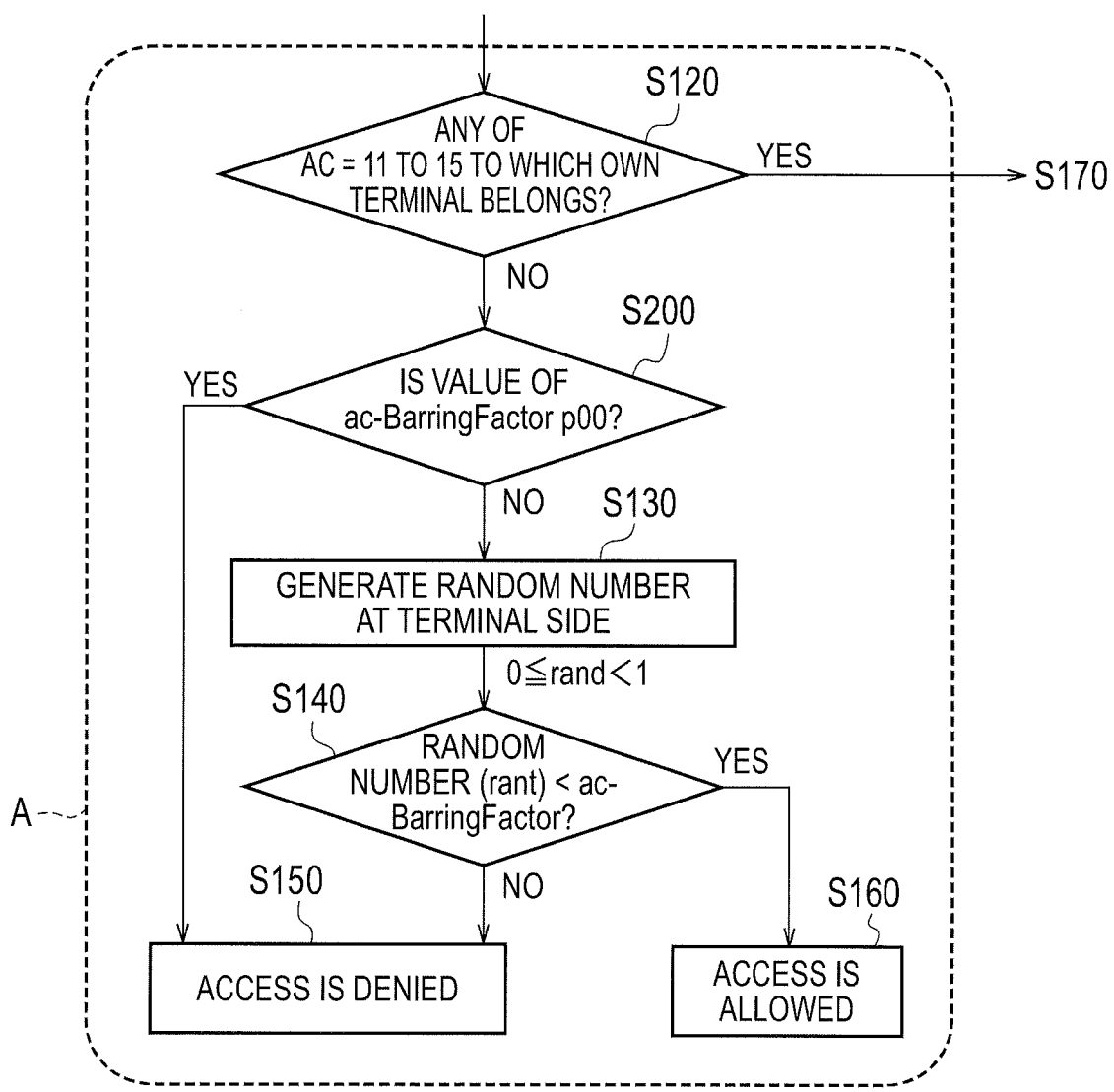
FIG. 6 is a flowchart illustrating a modification of the operation of FIG. 5.

FIG. 6 illustrates a modification that can further reduce wasteful processing. FIG. 6 replaces the portion indicated by A in FIG. 5 (No at S120 to S160), and the same step is denoted with the same number.

When causing the information of the ac-BarringFactor to be decoded, the access control processing unit 40 determines whether the decoded information is p00 (information indicating 0% in which an access is always denied when compared with a random number) (S200).

When it is information other than p00 (p05 to p95), an access may be allowed or denied according to the numerical value generated by the mobile device, as described above. Therefore, the access control processing unit 40 causes a random number to be actually generated (S130), converts the information of the ac-BarringFactor into a numerical value to be compared (5% to 95%), checks the magnitude relationship between the numerical value and the generated random number (S140), and determines the appropriateness of an access.

When it is p00, the access control processing unit 40 determines that an access is denied without doing anything (S150). Accordingly, it becomes possible to determine an access is denied without causing the random number generation unit 70 to generate a random number and without converting the information of the ac-BarringFactor into a numerical value to be compared.

According to the operation of the mobile device as described above, whether the appropriateness of an access is determined by referring to the ac-BarringFactor (No at S120) or whether the appropriateness of an access is determined by referring to the ac-BarringForSpecialAC (Yes at S120) is determined first based on the information of the AC that is internal information of the own device. Therefore, it is not necessary to decode the barring information that is not to be referred.

Figure 7:
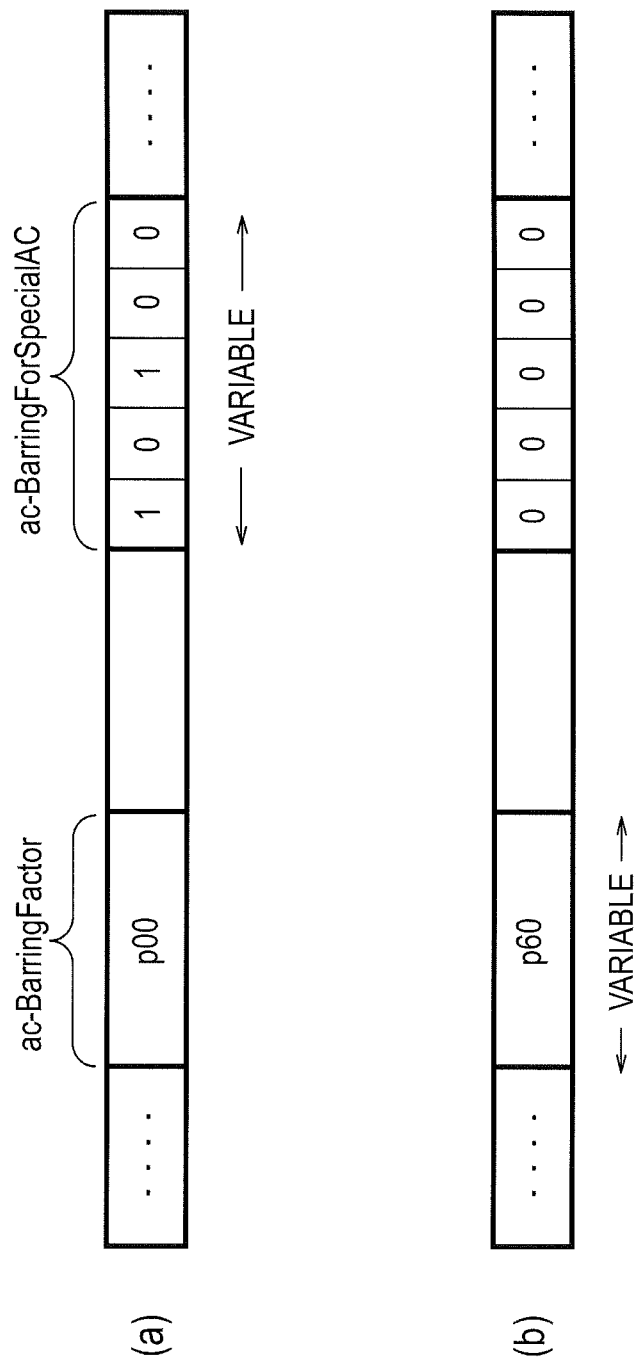
FIG. 7 is a diagram illustrating content favorable as the notification information of FIG. 2 with respect to the mobile device of FIGS. 4 to 6.
Figure 8:
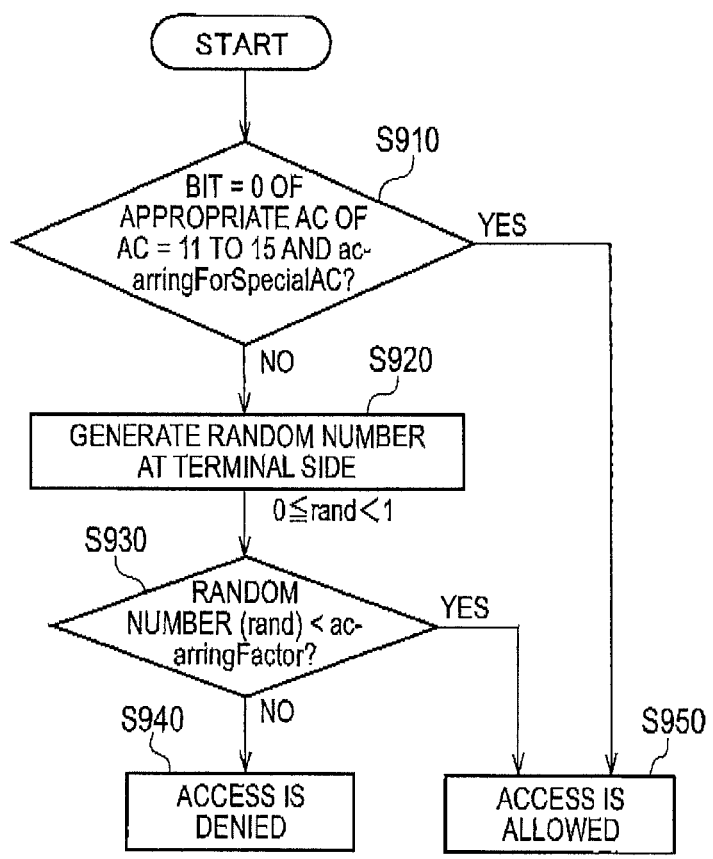
FIG. 8 is a diagram describing access barring in a L3 layer in the W-CDMA.

FIG. 7 is a diagram for describing content of barring information that is desirable to be notified with the SIB2 from the radio access network to the mobile device that performs the operation described with reference to FIGS. 4 to 6.

FIG. 7(*a*) illustrates a case in which p00 is set as the ac-BarringFactor, and E-UTRAN can designate barring (1) in a bit sequence of the ac-BarringForSpecialAC only in this case.

FIG. 7(*b*) illustrates a case in which information other than p00 is set as the ac-BarringFactor, E-UTRAN configures all bit sequences of the ac-BarringForSpecialAC with "0" (no barring). In other words, only in the case where all bit sequences of the ac-BarringForSpecialAC are configured from "0" (no barring), the ac-BarringFactor can be arbitrary set.

If the barring information notified from the network is barred in this way, a reverse phenomenon of the degree of preference can be prevented, the reverse phenomenon being such that, while an access of the mobile device having the special type AC is denied (S190) because the barring (1) is designated in the ac-BarringForSpecialAC, an access of the mobile device having the normal type AC is allowed (S160) because the information having a possibility of allowing an access (p05 to p95) is set in the ac-BarringFactor.

While an embodiment of the present invention has been described above, it is apparent that a person skilled in the art can perform various modifications and applications of the above-described embodiment within the scope of the present invention.

REFERENCE SIGNS LIST

10 Notification information reception unit
20 Barring information storage unit
30 Barring information decoding unit
40 Access control processing unit
50 Access execution unit
60 UIM card
65 AC information storage unit
70 Random number generation unit

The invention claimed is:

1. A method of barring an access to a network from a mobile device connectable to a radio access network,
   each mobile device connectable to the radio access network belonging to at least one access class,
   a special type access class and a normal type access class existing in the access class,
   notification information to be notified to each mobile device from the radio access network including barring information for barring an access to the network, and
   the barring information including a first barring information for designating whether a mobile device belonging to each access class is subject to access barring, and second barring information indicating a value serving as a reference for determining appropriateness of an access according to a relationship between the value and a numerical value generated by each mobile device,
   the mobile device
   determining whether the mobile device includes the special type access class as an access class to which the mobile device itself belongs when starting establishment of connection to the radio access network;
   when having determined that the mobile device includes the special type access class, referring to the first barring information, and determining the appropriateness of an access according to designation by the first barring information; and
   when having determined that the mobile device does not include the special type access class, referring to the second barring information, and determining the appropriateness of an access according to a relationship between the reference indicated by the second barring information and a numerical value generated by the mobile device itself,
   wherein the appropriateness of an access denotes that if appropriate the access is allowed and if inappropriate the access is barred, and
   wherein the mobile device decodes the first barring information from the received barring information when referring to the first barring information, and decodes the second barring information from the received barring information when referring to the second barring information.

2. The method of barring an access to a network according to claim 1, wherein the mobile device determines whether the reference indicated by the second barring information is a value determined that an access is denied regardless of the numerical value generated by the mobile device when referring to the second barring information, determines that an access is denied without generating the numerical value if the value is such a value, and determines the appropriateness of an access by generating the numerical value and performing comparison between the numerical value and the value serving as the reference if the value is not such a value.

3. The method of barring an access to a network according to claim 2, wherein, when the first barring information is information that designates a certain mobile device is subject to access barring while another mobile device is not subject to access barring, the reference indicated by the second barring information is a value determined that an access is denied regardless of the numerical value generated by the mobile device.

4. The method of barring an access to a network according to claim 2, wherein the value serving as the reference is determined based on a percentage of mobile device, an access of which is desired to be allowed in the network, and the numerical value generated by each mobile device is a number functioning as a random number.

5. The method of barring an access to a network according to claim 2, wherein the mobile device starts a setting procedure of radio resource control (RRC) connection to the network in accordance with determination that an access is allowed.

6. The method of barring an access to a network according to claim 2, wherein the radio access network operates according to a long term evolution (LTE) system.

7. The method of barring an access to a network according to claim 1, wherein, when the first barring information is information that designates a certain mobile device is subject to access barring while another mobile device is not subject to access barring, the reference indicated by the second barring information is a value determined that an access is denied regardless of the numerical value generated by the mobile device.

8. The method of barring an access to a network according to claim 7, wherein the value serving as the reference is determined based on a percentage of mobile device, an access of which is desired to be allowed in the network, and the numerical value generated by each mobile device is a number functioning as a random number.

9. The method of barring an access to a network according to claim 7, wherein the mobile device starts a setting procedure of radio resource control (RRC) connection to the network in accordance with determination that an access is allowed.

10. The method of barring an access to a network according to claim 1, wherein the value serving as the reference is determined based on a percentage of mobile device, an access of which is desired to be allowed in the network, and the numerical value generated by each mobile device is a number functioning as a random number.

11. The method of barring an access to a network according to claim 1, wherein the mobile device starts a setting procedure of radio resource control (RRC) connection to the network in accordance with determination that an access is allowed.

12. The method of barring an access to a network according to claim 1, wherein the radio access network operates according to a long term evolution (LTE) system.

13. A mobile device connectable to a radio access network, each mobile device connectable to the radio access network belonging to at least one access class, and a special type access class and a normal type access class existing in the access class, the mobile device comprising:
a reception means configured to receive notification information notified from the radio access network;
a storage means configured to take out from the notification information and store barring information for barring an access to the network and including a first barring information for designating whether a mobile device belonging to each access class is subject to access barring and second barring information indicating a value serving as a reference for determining appropriateness of an access according to a relationship between the value and a numerical value generated by each mobile device;
a storing means configured to store information indicating at least one access class to which the mobile device itself belongs;
a generation means configured to select one numerical value from among a plurality of available numerical values every time generation of a numerical value is instructed and to generate the numerical value at the time of instruction; and
a determination means configured to determine whether the mobile device includes the special type access class based on the information of the storing means, to refer to the first barring information stored in the storage means and to determine the appropriateness of an access according to designation of the first barring information when having determined that mobile device includes the special type access class, to refer to the second barring information stored in the storage means and to determine the appropriateness of an access according to a relationship between the reference indicated by the second barring information and the numerical value generated by the generation means when having determined that mobile device does not includes the special type access class,
wherein the appropriateness of an access denotes that if appropriate the access is allowed and if inappropriate the access is barred, and
wherein the mobile device decodes the first barring information from the received barring information when referring to the first barring information, and decodes the second barring information from the received barring information when referring to the second barring information.

14. The mobile device connectable to a radio access network according to claim 13, wherein the mobile device determines whether the reference indicated by the second barring information is a value determined that an access is denied regardless of the numerical value generated by the mobile device when referring to the second barring information, determines that an access is denied without generating the numerical value if the value is such a value, and determines the appropriateness of an access by generating the numerical value and performing comparison between the numerical value and the value serving as the reference if the value is not such a value.

15. A processor incorporated in and used by a mobile device,
each mobile device connectable to a radio access network belonging to at least one access class,
a special type access class and a normal type access class existing in the access class,
notification information to be notified to each mobile device from the radio access network including barring information for barring an access to the network, and
the barring information including a first barring information for designating whether a mobile device belonging to each access class is subject to access barring, and second barring information indicating a value serving as a reference for determining appropriateness of an access according to a relationship between the value and a numerical value generated by each mobile device,
the processor
determining whether the mobile device includes the special type access class as an access class to which the mobile device itself belongs when starting establishment of connection to the radio access network;
when having determined that the mobile device includes the special type access class, referring to the first barring information, and determining the appropriateness of an access according to designation by the first barring information; and when having determined that the mobile device does not include the special type access class, referring to the second barring information, and determining the appropriateness of an access according to a relationship between the reference indicated by the second barring information and a numerical value generated by the mobile device itself, wherein the appropriateness of an access denotes that if appropriate the access is allowed and if inappropriate the access is barred, and wherein the mobile device decodes the first barring information from the received barring information when referring to the first barring information, and decodes the second barring information from the received barring information when referring to the second barring information.

16. The processor incorporated in and used by the mobile device according to claim 15, wherein the mobile device determines whether the reference indicated by the second barring information is a value determined that an access is denied regardless of the numerical value generated by the mobile device when referring to the second barring information, determines that an access is denied without generating the numerical value if the value is such a value, and determines the appropriateness of an access by generating the numerical value and performing comparison between the numerical value and the value serving as the reference if the value is not such a value.

* * * * *